United States Patent
Kobayashi et al.

(10) Patent No.: US 12,289,583 B2
(45) Date of Patent: Apr. 29, 2025

(54) SOUND COLLECTION AND EMISSION APPARATUS, SOUND COLLECTION AND EMISSION METHOD, AND PROGRAM

(71) Applicant: NIPPON TELEGRAPH AND TELEPHONE CORPORATION, Tokyo (JP)

(72) Inventors: Kazunori Kobayashi, Tokyo (JP); Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 172 days.

(21) Appl. No.: 17/640,305

(22) PCT Filed: Sep. 9, 2019

(86) PCT No.: PCT/JP2019/035344
§ 371 (c)(1),
(2) Date: Mar. 3, 2022

(87) PCT Pub. No.: WO2021/048893
PCT Pub. Date: Mar. 18, 2021

(65) Prior Publication Data
US 2022/0329936 A1 Oct. 13, 2022

(51) Int. Cl.
*H04R 3/00* (2006.01)
*B60R 11/02* (2006.01)
(Continued)

(52) U.S. Cl.
CPC ........... *H04R 3/00* (2013.01); *H04R 2430/01* (2013.01); *H04R 2499/13* (2013.01)

(58) Field of Classification Search
None
See application file for complete search history.

(56) References Cited

U.S. PATENT DOCUMENTS

2013/0223643 A1 8/2013 Sato et al.
2016/0355125 A1* 12/2016 Herbert ............... G08G 1/0965
(Continued)

FOREIGN PATENT DOCUMENTS

JP       H08-2339 A     1/1996
JP      2009014653 A    1/2009
(Continued)

OTHER PUBLICATIONS

Amon Industry Co., Ltd., "Seion keikaku" (scheme for silence), [online], [retrieved on Aug. 15, 2019], from the Internet: <URL: https://www.amon.jp/products/topics/seion/> with English translation generated by computer.

*Primary Examiner* — Qin Zhu

(57) ABSTRACT

Audibility of an outside sound needed for a driver inside an automobile to apprehend a danger and obtain a grasp of a situation necessary for driving is improved. A sound collection and emission apparatus (10) emits, on the basis of an outside acoustic signal which emanates from a sound source outside an automobile (90) and arrives at the automobile (90), an inside acoustic signal which is an acoustic signal derived from the outside acoustic signal to inside the automobile (90). A sound collection unit (M1) collects the outside acoustic signal. A sound emission unit (S1) emits the inside acoustic signal. A danger sound detection unit (11) determines whether the outside acoustic signal has a feature representing a danger defined in advance. A control unit (12) performs control that emits the inside acoustic signal from the sound emission unit (S1) such that a driver of the automobile (90) is capable of perceiving the danger if the outside acoustic signal is determined to represent the danger.

8 Claims, 7 Drawing Sheets

(51) Int. Cl.
*B60W 40/04* (2006.01)
*B60W 50/14* (2020.01)
*H04R 1/40* (2006.01)
*H04S 3/00* (2006.01)

(56) References Cited

U.S. PATENT DOCUMENTS

| | | | | |
|---|---|---|---|---|
| 2016/0379621 | A1* | 12/2016 | Marti | B60Q 9/00 |
| | | | | 381/71.4 |
| 2018/0077506 | A1* | 3/2018 | Wacquant | H04R 3/005 |
| 2018/0139533 | A1* | 5/2018 | Jain | A61B 5/12 |
| 2019/0045319 | A1* | 2/2019 | Hotary | H04S 7/303 |
| 2020/0100028 | A1* | 3/2020 | Hashimoto | G08G 1/16 |

FOREIGN PATENT DOCUMENTS

| | | |
|---|---|---|
| JP | 2013-177095 A | 9/2013 |
| JP | 2019121887 A | 7/2019 |

\* cited by examiner

SOUND COLLECTION AND EMISSION APPARATUS, SOUND COLLECTION AND EMISSION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/035344, filed on 9 Sep. 2019, the disclosure of which is hereby incorporated herein by reference in its entirety.

TECHNICAL FIELD

The present invention relates to a technique for presenting a sound outside an automobile to inside the automobile.

BACKGROUND ART

An automobile is equipped with various sensors and warning apparatuses. The sensors and apparatuses are used to implement, for example, a function of making a warning sound on the point of rear-ending an automobile in front and making a warning sound if there is another running car on a running lane at the time of changing to the lane.

A running automobile generates various noises, such as an engine noise, a wind noise, and a vibration noise of a vehicle body, which become a factor in reducing passenger comfort. For this reason, there is a need for a design, parts, and the like which improve sound insulation of an automobile (see, for example, Non-Patent Literature 1). Sounds outside an automobile, such as a horn, a railroad crossing bell, an ambulance siren, and a running sound of a car running side by side, include information useful to apprise a driver of a danger and useful for a driver to apprehend a danger.

CITATION LIST

Non-Patent Literature

Non-Patent Literature 1: Amon Industry Co., Ltd., "Seion keikaku" (scheme for silence), [online], [retrieved on Aug. 15, 2019], from the Internet: <URL: https://www.amon.jp/products/topics/seion/>

SUMMARY OF THE INVENTION

Technical Problem

In a general automobile, an outside sound coming through a window is transmitted to inside the automobile. For this reason, there are cases where a driver inside an automobile has trouble catching an outside sound, such as a case where the automobile has high sound insulation, a case where the driver suffers from an age-related decline in hearing, and a case where the driver is listening to audio equipment or the radio inside the automobile. Although insulation against unnecessary noises allows implementation of a comfortable in-automobile space, if insulation against a sound necessary to apprehend a danger or operate an automobile is provided, it is difficult to apprehend a danger and obtain a grasp of a situation necessary for driving on the basis of a sound.

An object of this invention is to, in view of the above-described technical problem, provide a technique for improving audibility of an outside sound needed for a driver inside an automobile to apprehend a danger and obtain a grasp of a situation necessary for driving without amplifying unnecessary outside noises inside the automobile.

Means for Solving the Problem

In order to solve the above-described problem, a sound collection and emission apparatus according to a first aspect of this invention is a sound collection and emission apparatus for emitting, on the basis of an outside acoustic signal which emanates from a sound source outside a given automobile and arrives at the automobile, an inside acoustic signal which is an acoustic signal derived from the outside acoustic signal to inside the automobile, including a sound collection unit which collects the outside acoustic signal, a sound emission unit which emits the inside acoustic signal, a determination unit which determines whether the outside acoustic signal has a feature representing a danger defined in advance, and a control unit which performs control that emits the inside acoustic signal from the sound emission unit such that a driver of the automobile is capable of perceiving the danger if the outside acoustic signal is determined to represent the danger.

In order to solve the problem, a sound collection and emission apparatus according to a second aspect of this invention is a sound collection and emission apparatus for emitting, on the basis of an outside acoustic signal which emanates from a sound source outside a given automobile and arrives at the automobile, an inside acoustic signal which is an acoustic signal derived from the outside acoustic signal to inside the automobile, including a sound collection unit which collects the outside acoustic signal, a sound emission unit which emits the inside acoustic signal, a state acquisition unit which acquires information representing an operating state of the automobile, and a control unit which performs control on whether to emit the inside acoustic signal from the sound emission unit on the basis of the information representing the operating state.

Effects of the Invention

This invention improves audibility of an outside sound needed for a driver inside an automobile to apprehend a danger and obtain a grasp of a situation necessary for driving.

DESCRIPTION OF EMBODIMENTS

Figure 1:
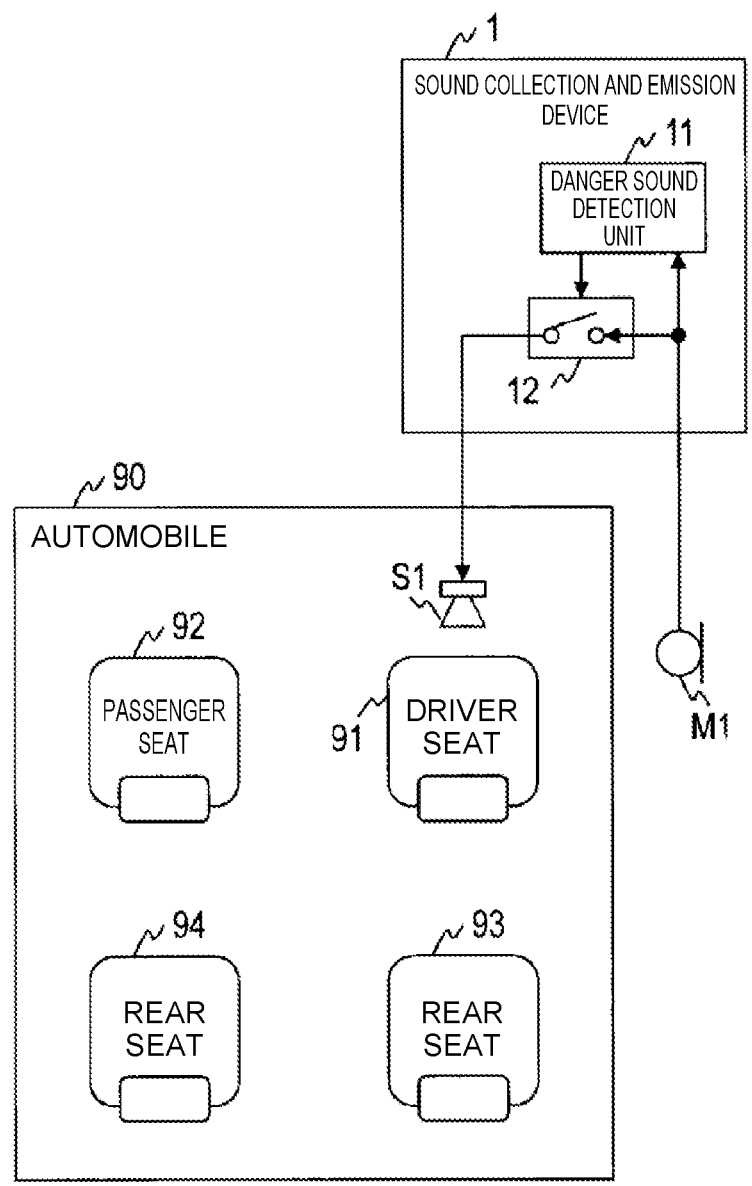
FIG. 1 is a diagram illustrating a functional configuration of a sound collection and emission apparatus according to a first embodiment.

Embodiments of this invention will be described below in detail. Note that constituent units having the same functions in the drawings are denoted by the same reference numerals and that a redundant description thereof will be omitted.

First Embodiment

FIG. 1 shows an example of a functional configuration of a sound collection and emission apparatus 1 according to a first embodiment. The sound collection and emission apparatus 1 is mounted on an automobile 90, collects sounds outside the automobile 90, and emits only a sound useful for a driver to apprehend a danger and obtain a grasp of a situation necessary for driving to inside the automobile 90. The present embodiment assumes that the automobile 90 includes a driver seat 91 and a passenger seat 92 in a front row and two rear seats 93 and 94 in a rear row. However, the automobile 90 only needs to include at least the driver seat 91, and the number and arrangement of other seats are not limited.

The sound collection and emission apparatus 1 according to the first embodiment includes at least one sound collection unit M1, at least one sound emission unit S1, a danger sound detection unit 11 (hereinafter also referred to as a "determination unit"), and a switch unit 12 (hereinafter also referred to as a "control unit"). An output from the sound collection unit M1 is input to the danger sound detection unit 11 and the switch unit 12. An output from the danger sound detection unit 11 is input to the switch unit 12. An output from the switch unit 12 is input to the sound emission unit S1. The sound collection unit M1 may be installed outside the automobile 90 or may be installed inside the automobile 90. The sound collection and emission apparatus 1 performs processing to be described below, thereby implementing a sound collection and emission method according to the first embodiment.

The sound collection and emission apparatus 1 is a special apparatus which is constructed when a special program is read into a publicly known or dedicated computer having, for example, a central processing unit (CPU) and a main storage unit (RAM: Random Access Memory). The sound collection and emission apparatus 1 executes processes, for example, under control of the central processing unit. Data input to the sound collection and emission apparatus 1 and data obtained by processes are stored in, for example, the main storage unit, and data stored in the main storage unit is read out into the central processing unit on an as-needed basis and is used for other processes. At least a part of the sound collection and emission apparatus 1 may be composed of hardware, such as an integrated circuit.

The sound collection unit M1 is installed at a position where a sound outside the automobile 90 can be collected and collects a sound which emanates from a sound source outside the automobile 90 and arrives at the automobile 90. The sound collection unit M1 is, for example, a microphone or a vibration sensor. Examples of the installation position of the sound collection unit M1 include an outside of the automobile 90, an inside of a body, and an inside of a window. The sound collection unit M1 outputs an acoustic signal (hereinafter also referred to as an "outside acoustic signal") which represents a collected outside sound to the danger sound detection unit 11.

The danger sound detection unit 11 receives, as input, an outside acoustic signal which is output by the sound collection unit M1 and detects a danger point including a feature representing a predetermined danger sound from the outside acoustic signal. A danger sound here refers to a sound to be used for determination of a predetermined danger or determination at the time of operation of an automobile or a sound arising from an event which is included in an outside acoustic signal and represents, for example, a horn, a siren, a railroad crossing bell, a running sound of a car running side by side, an impact sound produced by an accident or the like, a voice, or the like. The danger sound detection unit 11 outputs a determination result indicating whether a danger point is detected to the switch unit 12.

Figure 2A:
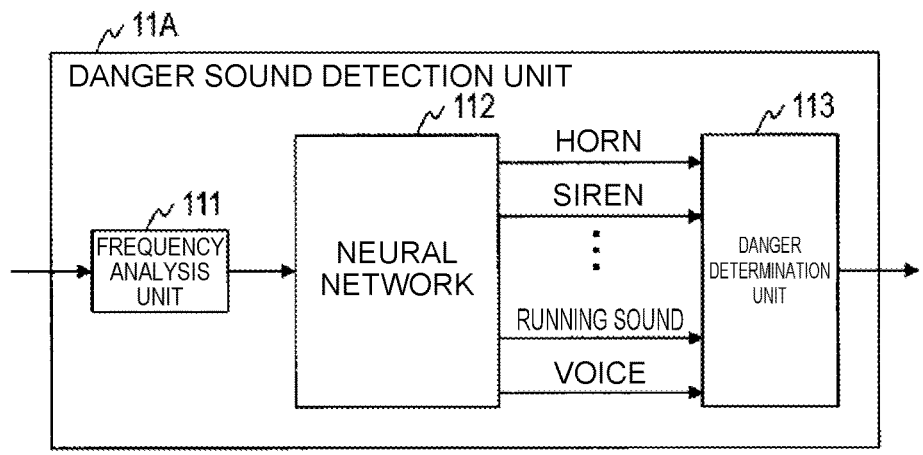
FIG. 2 is a diagram illustrating a functional configuration of a danger sound detection unit.

FIG. 2A shows a first configuration example of the danger sound detection unit 11. A danger sound detection unit 11A shown in FIG. 2A includes a frequency analysis unit 111, a neural network 112, and a danger determination unit 113.

The frequency analysis unit 111 converts an outside acoustic signal output by the sound collection unit M1 into a frequency-domain signal. As a way of frequency conversion, for example, a process of performing a multiplication by a window using a frame size of several tens to several hundreds of milliseconds and performing conversion to frequency domain through a Fourier transform can be used. Power may be calculated after a Fourier transform and be converted into a power spectrum or a mel spectrum may be obtained by averaging frequencies on a log scale. The frequency analysis unit 111 outputs one frame of an outside acoustic signal after frequency conversion or collectively outputs a plurality of frames to the neural network 112.

The neural network 112 is a neural network which has learned a frequency spectrum in advance of a danger sound. The neural network 112 receives, as input, an outside acoustic signal after frequency conversion and obtains an estimated value of likelihood for each danger type. The neural network 112 outputs the estimated value of the likelihood for each danger type to the danger determination unit 113.

The danger determination unit 113 receives, as input, an estimated value of likelihood for each danger type and detects a danger point. Specifically, the danger determination unit 113 selects a danger type with maximum likelihood on the basis of the input estimated values of the likelihood for the respective danger types, and determination as a danger point is performed if the likelihood is more than a threshold defined in advance. The danger determination unit 113 sets a determination result as an output from the danger sound detection unit 11.

Figure 2B:
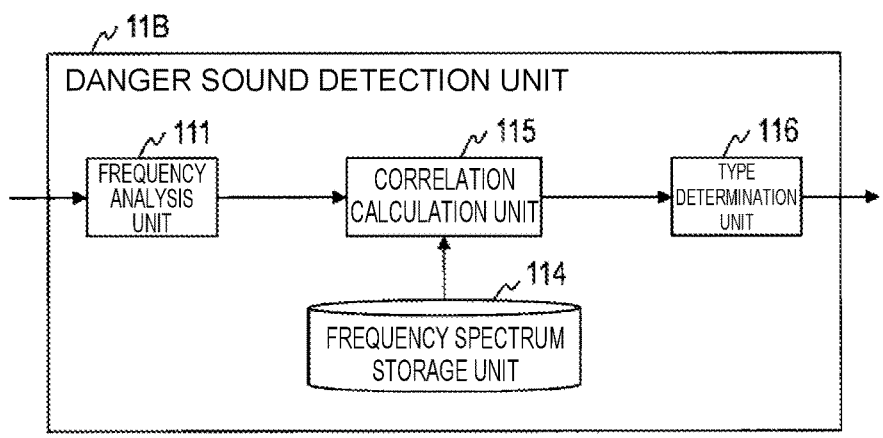

FIG. 2B shows a second configuration example of the danger sound detection unit 11. A danger sound detection unit 11B shown in FIG. 2B includes the frequency analysis unit 111, a frequency spectrum storage unit 114, a correlation calculation unit 115, and a type determination unit 116.

At least one typical example of a frequency spectrum which can be generated at a danger point is stored for each danger type in the frequency spectrum storage unit 114.

The correlation calculation unit 115 calculates, for each danger type, a correlation between an outside acoustic signal after frequency conversion which is output by the frequency analysis unit 111 and a frequency spectrum stored in the frequency spectrum storage unit 114. The correlation calculation unit 115 outputs the correlation for each danger type to the type determination unit 116.

The type determination unit 116 receives, as input, a correlation for each danger type and detects a danger point. Specifically, the type determination unit 116 selects a danger type with a highest correlation on the basis of the input correlations for the respective danger types, and determines that a danger of the type is detected if the correlation is more than a threshold defined in advance. The type determination unit 116 sets a determination result as an output from the danger sound detection unit 11.

Figure 2C:
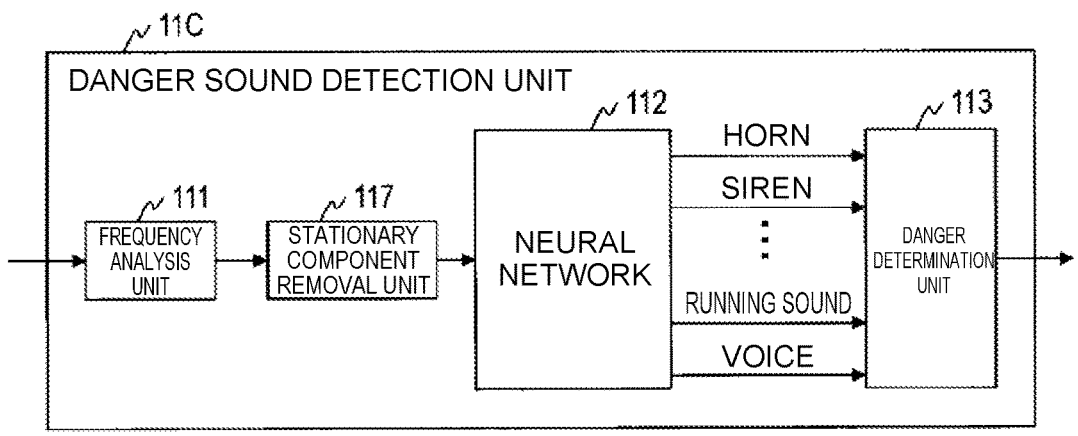

FIG. 2C shows a third configuration example of the danger sound detection unit 11. A danger sound detection unit 11C shown in FIG. 2C includes a stationary component removal unit 117 at a stage subsequent to the frequency analysis unit 111 in the danger sound detection unit 11A as the first configuration example.

The stationary component removal unit 117 removes a stationary noise component from an outside acoustic signal after frequency conversion which is output by the frequency analysis unit 111. Specifically, the stationary component removal unit 117 takes a long-time average of outside acoustic signals after frequency conversion for, for example, several tens of seconds and obtains a stationary noise component, and subtracts the stationary noise component from an outside acoustic signal after frequency conversion. The inclusion of the stationary component removal unit 117 removes a stationary noise, such as a running sound of the vehicle in question, from an outside acoustic signal and allows easier detection of a danger point.

The switch unit 12 controls whether to output, from the sound emission unit S1, an outside acoustic signal which is output by the sound collection unit M1 by switching an on-off status on the basis of a determination result which is output by the danger sound detection unit 11. The switch unit 12 outputs an input outside acoustic signal to the sound emission unit S1 when the switch unit 12 is ON and outputs nothing when the switch unit 12 is OFF. The switch unit 12 is configured to be set to ON if a determination result indicates that a danger point is detected and be set to OFF in the other cases.

The sound emission unit S1 is installed inside the automobile 90, particularly in the vicinity of the driver seat 91, and emits an acoustic signal (hereinafter also referred to as an "inside acoustic signal") derived from an outside acoustic signal which is collected by the sound collection unit M1. The inside acoustic signal may be the outside acoustic signal itself or an acoustic signal which is obtained by converting the outside acoustic signal such that a driver on the driver seat 91 can easily catch the outside acoustic signal. The sound emission unit S1 is, for example, a speaker. To convert an acoustic signal, for example, an equalizer may be used.

The sound emission unit S1 may form a beam which embraces an ear of a driver and emit a sound so as to allow the driver to easily perceive the sound, or may emit a sound with a danger sound more exaggerated than in a different acoustic signal if the different acoustic signal is emitted to inside the automobile.

With the above-described configuration, the sound collection and emission apparatus 1 according to the first embodiment emits a danger sound to inside the automobile 90 only when the sound collection and emission apparatus 1 detects the danger sound from sounds arriving from outside the automobile 90. For this reason, the sound collection and emission apparatus 1 according to the first embodiment allows a driver to easily perceive a danger sound without transmitting an unnecessary outside noise to inside the automobile 90.

First Modification

The first embodiment has described an example where a sound collection and emission apparatus includes one sound collection unit and one sound emission unit. A first modification will describe an example where a sound collection and emission apparatus includes a plurality of sound collection units and a plurality of sound emission units.

Figure 3:
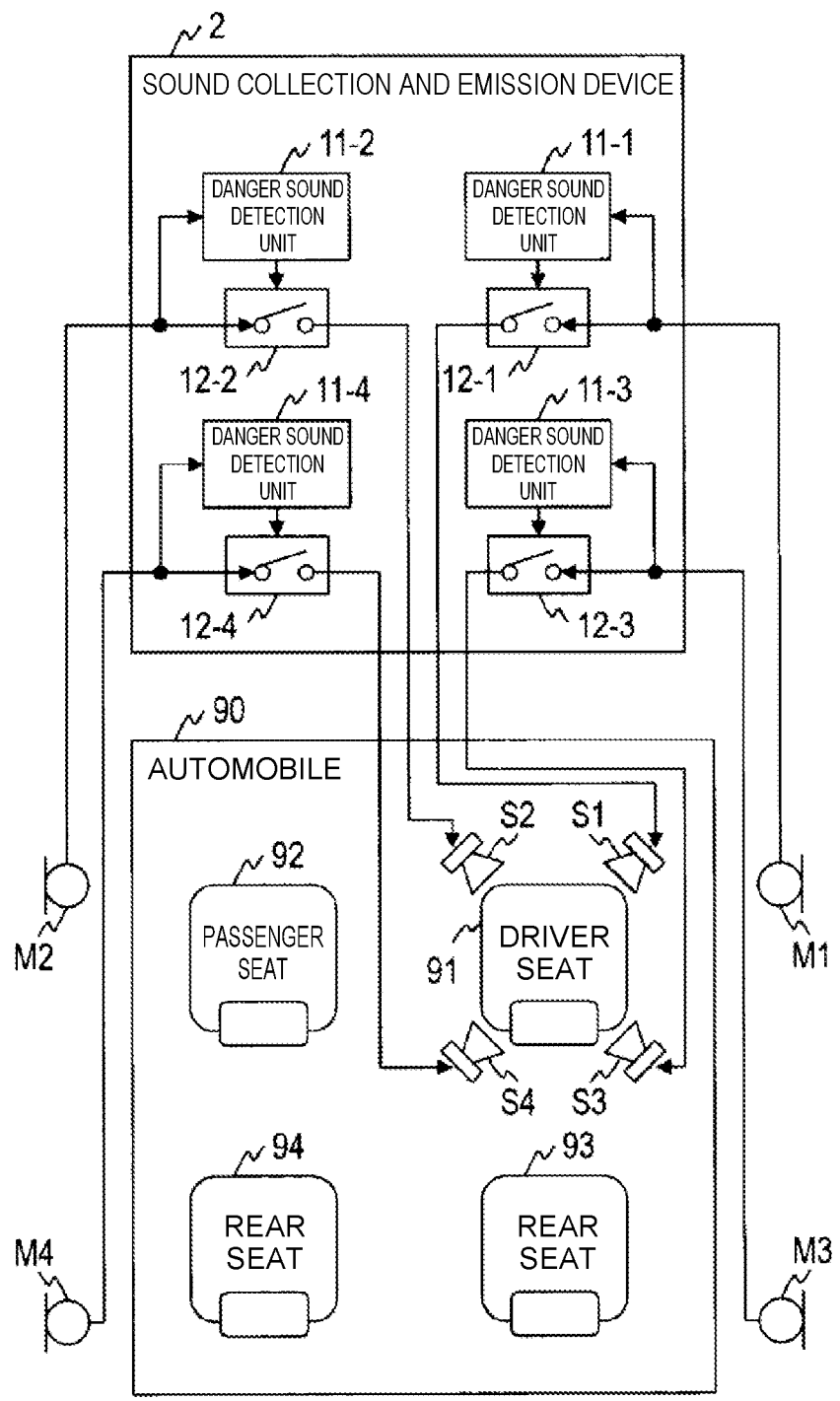
FIG. 3 is a diagram illustrating a functional configuration of a sound collection and emission apparatus according to a first modification.

A sound collection and emission apparatus 2 according to the first modification includes four sound collection units M1 to M4, four sound emission units S1 to S4, four danger sound detection units 11-1 to 11-4, and four switch units 12-1 to 12-4, as shown in FIG. 3. An output from a sound collection unit Mi (i=1, . . . , 4) is input to a danger sound detection unit 11-$i$ and a switch unit 12-$i$. An output from the danger sound detection unit 11-$i$ is input to the switch unit 12-$i$. An output from the switch unit 12-$i$ is input to a sound emission unit Si.

The sound collection units M1 to M4 are installed so as to collect sounds arriving from four directions different from one another. The sound emission units S1 to S4 are installed around the driver seat 91 so as to correspond to sound collection directions, respectively, of the sound collection units M1 to M4. The danger sound detection units 11-1 to 11-4 and the switch units 12-1 to 12-4 perform danger sound detection and sound emission control for each of sets of sound collection units and sound emission units corresponding to the respective directions. That is, four sets, each having the processing units which the sound collection and emission apparatus 1 according to the first embodiment includes, are prepared, and the same processing as in the first embodiment is performed for each of the four directions different from one another. Although an example with four directions has been illustrated here, the number of sets of processing units may be increased so as to correspond to more directions. This allows a driver to perceive an arrival direction of a danger sound and more appropriately take action to address a danger.

Second Modification

A second modification will describe another example where a sound collection and emission apparatus includes a plurality of sound collection units and a plurality of sound emission units. A difference from the first modification is that the second modification includes only one danger sound detection unit.

Figure 4:
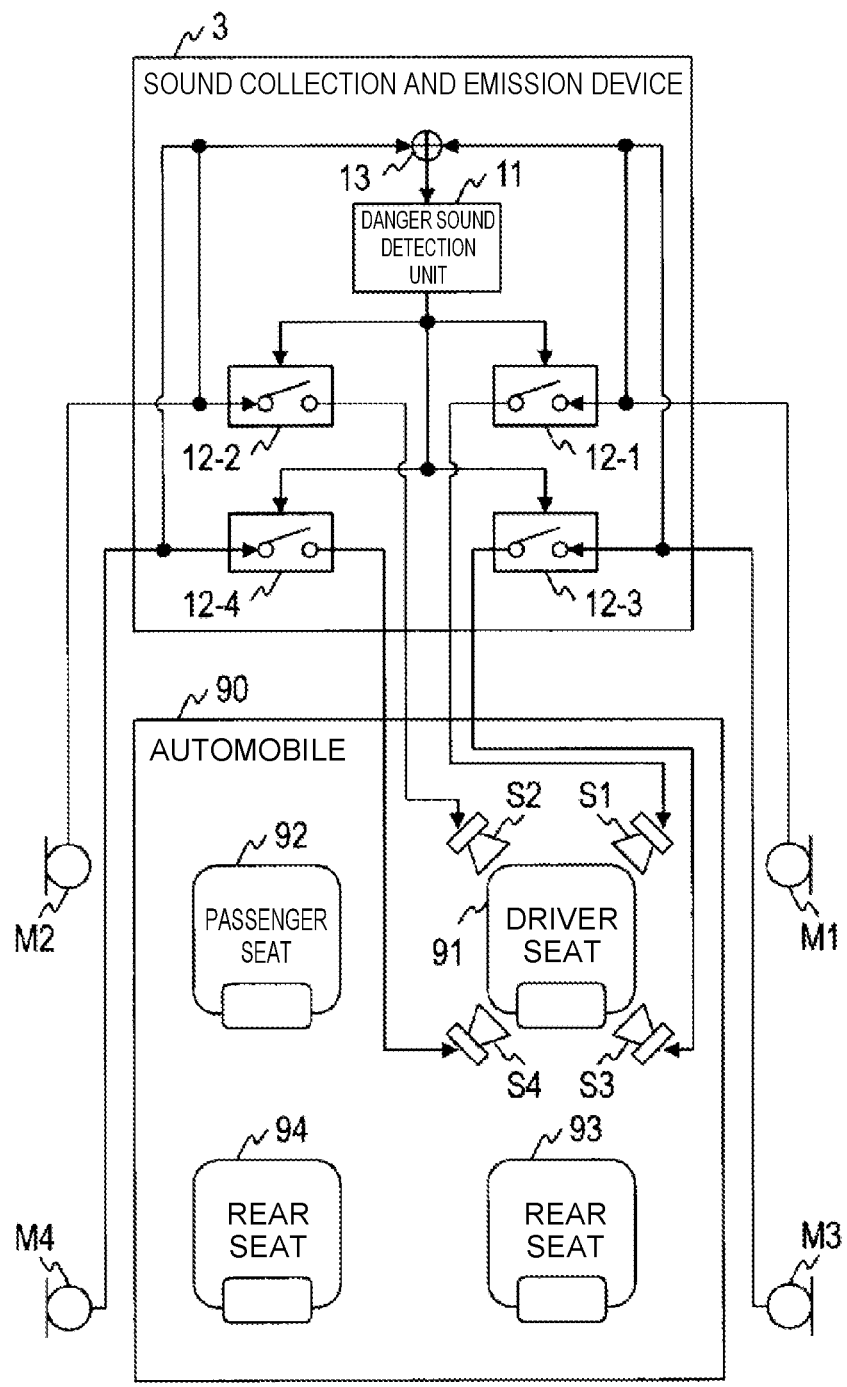
FIG. 4 is a diagram illustrating a functional configuration of a sound collection and emission apparatus according to a second modification.

A sound collection and emission apparatus 3 according to the second modification includes four sound collection units M1 to M4, four sound emission units S1 to S4, one danger sound detection unit 11, four switch units 12-1 to 12-4, and one addition unit 13, as shown in FIG. 4. An output from a sound collection unit Mi (i=1, . . . , 4) is input to a switch unit 12-$i$ and the addition unit 13. An output from the addition unit 13 is input to the danger sound detection unit 11. An output from the danger sound detection unit 11 is input to the switch units 12-1 to 12-4. An output from the switch unit 12-$i$ is input to a sound emission unit Si.

The sound collection units M1 to M4 and the sound emission units S1 to S4 are installed in the same manner as in the first modification, and the switch units 12-1 to 12-4 perform the same control as in the first modification. The addition unit 13 adds up all of output signals from the sound collection units M1 to M4 which are input and outputs the sum to the danger sound detection unit 11. The danger sound detection unit 11 performs danger point detection on an output signal from the addition unit 13. For this reason, if a danger sound is included in an outside acoustic signal arriving from any direction, inside acoustic signals are output from the sound emission units S1 to S4. If no outside acoustic signal includes a danger sound, nothing is output from the sound emission units S1 to S4.

Second Embodiment

The first embodiment has described a configuration which allows a driver to easily catch a danger sound if the danger sound is included in sounds collected outside an automobile. A second embodiment will describe a configuration which performs control such that a driver can hear only a sound necessary for driving, in accordance with an operating state of an automobile.

Figure 5:
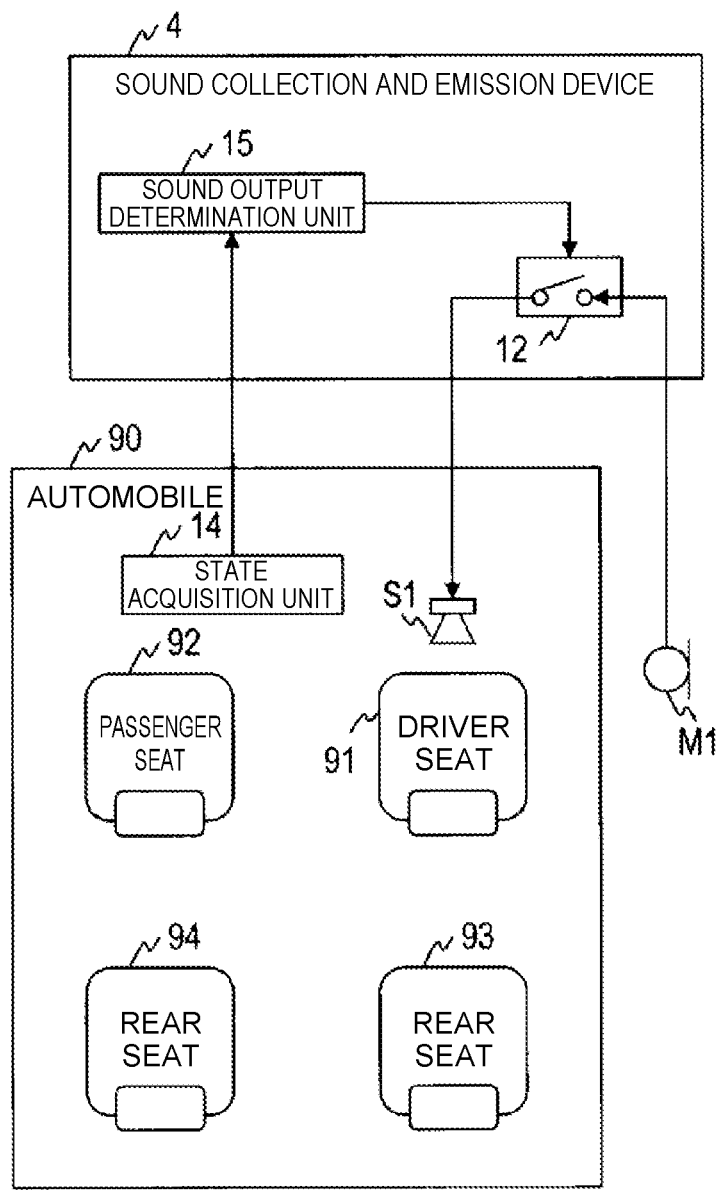
FIG. 5 is a diagram illustrating a functional configuration of a sound collection and emission apparatus according to a second embodiment.

A sound collection and emission apparatus 4 according to the second embodiment includes at least one sound collection unit M1, at least one sound emission unit S1, a switch unit 12, a state acquisition unit 14, and a sound output determination unit 15. An output from the state acquisition unit 14 is input to the sound output determination unit 15. An output from the sound output determination unit 15 is input to the switch unit 12. Although FIG. 5 shows an example with one sound collection unit and one sound emission unit, a plurality of sound collection units and a plurality of sound emission units corresponding to a plurality of directions may be provided, as in the first and second modifications. In this case, a plurality of switch units are provided corresponding in number to the sound collection units and the sound emission units, and an output from the sound output determination unit 15 is input to all the switch units.

The state acquisition unit 14 acquires information representing an operating state from an automobile 90 and outputs the information to the sound output determination unit 15. The information representing the operating state is, for example, a state of blinkers, a state of a transmission, a steering angle of a steering wheel, a running speed, or the like.

The sound output determination unit 15 determines, from information representing the operating state received from the state acquisition unit 14, whether to output, from the sound emission unit S1, an outside acoustic signal which is output by the sound collection unit M1. A criterion for determining whether to produce an output is defined in advance on the basis of whether a driver needs an outside sound in operation. For example, if a right blinker is ON, the sound output determination unit 15 performs control which outputs an acoustic signal collected by a sound collection unit installed on the right side of an automobile from a sound emission unit installed inside the automobile. If the right blinker is ON, and the running speed is not less than a speed set in advance, the sound output determination unit 15 may perform control which outputs an acoustic signal collected by a sound collection unit from a sound emission unit installed inside the automobile. In the case of the latter configuration, the sound output determination unit 15 can perform control such that an outside sound is not emitted during a stop (e.g., at the time of waiting for a right turn at an intersection) and such that an outside sound is emitted at the time of running (e.g., at the time of changing lanes). Alternatively, the sound output determination unit 15 may perform control such that the switch unit 12 is turned ON when gears are shifted to reverse. Since surroundings are hard to check at the time of backing up, the effect of making surroundings easy to know by a sound can be expected.

Third Embodiment

The sound collection and emission apparatuses according to the first and second modifications are configured to allow a driver to perceive an arrival direction of a danger sound by installing a plurality of sound collection units and a plurality of sound emission units corresponding to directions defined in advance. A third embodiment allows a driver to more accurately perceive an arrival direction of a danger sound by applying a sound image localization technique.

Figure 6:
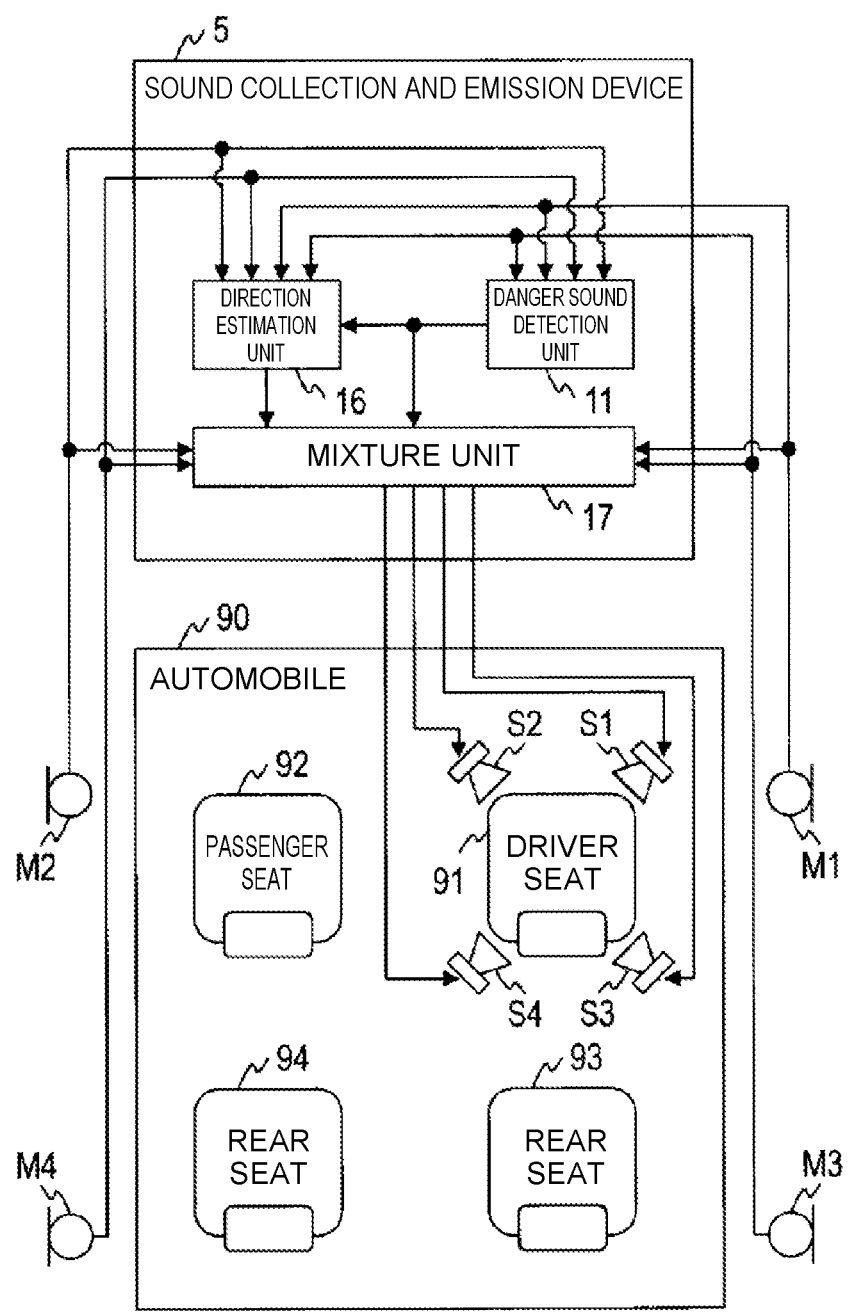
FIG. 6 is a diagram illustrating a functional configuration of a sound collection and emission apparatus according to a third embodiment.

A sound collection and emission apparatus 5 according to a third embodiment includes four sound collection units M1 to M4, four sound emission units S1 to S4, a danger sound detection unit 11, a direction estimation unit 16, and a mixture unit 17, as shown in FIG. 6. An output from a sound collection unit Mi (i=1, . . . , 4) is input to the danger sound detection unit 11, the sound direction estimation unit 16, and the mixture unit 17. An output from the danger sound detection unit 11 is input to the sound direction estimation unit 16 and the mixture unit 17. An output from the sound direction estimation unit 16 is input to the mixture unit 17. An output from the mixture unit 17 is input to the sound emission units S1 to S4.

The sound collection units M1 to M4 and the sound emission units S1 to S4 are installed in the same manner as in the first and second modifications.

The sound direction estimation unit 16 receives, as input, outside acoustic signals which are output by the sound collection units M1 to M4 and estimates an arrival direction of a sound. Specifically, the sound direction estimation unit 16 calculates a temporal difference between channels by a cross correlation method and obtains an arrival direction of a sound using the temporal difference. Alternatively, the sound direction estimation unit 16 obtains an arrival direction of a sound by the delay-and-sum method.

The mixture unit 17 mixes outside acoustic signals which are output by the sound collection units M1 to M4 and outputs mixed acoustic signals from the sound emission units S1 to S4. The mixture unit 17 outputs, from the sound emission units S1 to S4, acoustic signals obtained by collection by the sound collection units M1 to M4 in proportions set in advance, in accordance with an arrival direction of a sound which is estimated by the sound direction estimation unit 16. This allows localization of a sound image in the arrival direction of the sound. For example, to localize a sound image between the sound emission unit S1 and the sound emission unit S2, the mixture unit 17 outputs acoustic signals simultaneously from the sound emission unit S1 and the sound emission unit S2. If acoustic signals are output in proportions corresponding to a position where a sound image desires to be localized on the basis of a relationship between a sound image localization position at the time of stereophonic reproduction and a ratio in reproduction volume, a sound image can be localized at a desired position. Alternatively, a method which experimentally investigates a relationship between a sound image localization position and reproduction volume balance among the sound emission units in advance and saves, as a table, the relationship between a sound image localization position and reproduction volume balance among the sound emission units in advance may be adopted.

As described above, a sound image can be localized at other than a place where a sound emission unit is installed by reproducing acoustic signals with a balance corresponding to an arrival direction of a sound from a plurality of sound emission units. This allows a driver to identify a place of generation of a danger sound just by hearing a sound.

The embodiments of this invention have been described above. A specific configuration is not limited to the embodiments, and it will be appreciated that, even if an appropriate change or the like is made to a design without departing from the spirit of this invention, the design is also included in this invention. The various types of processes described in the embodiments are not limited to chronological execution in the described order and may be executed in parallel or individually in accordance with processing capacity of a device which is to execute the processes or on an as-needed basis.

[Program and Recording Medium]

Figure 7:
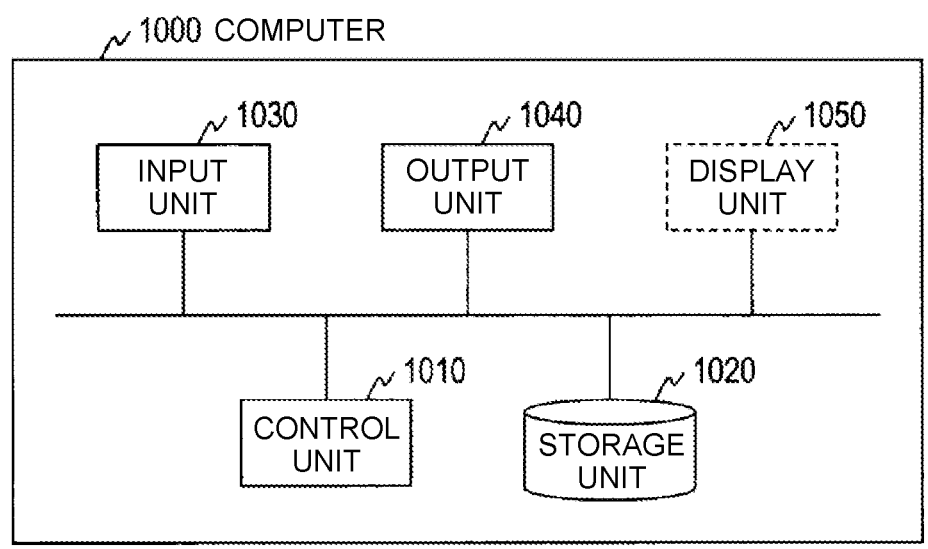
FIG. 7 is a diagram illustrating a functional configuration of a computer.

If the various types of processing functions in each of the devices described in the above-described embodiments are implemented by a computer, processing details of functions which the device is to have are described in a program. The program is loaded into a storage unit 1020 of a computer shown in FIG. 7, and a control unit 1010, an input unit 1030, an output unit 1040, and the like are caused to operate, thereby implementing the various types of processing functions in each device on the computer.

The program describing the processing details can be recorded on a computer-readable recording medium. Anything, such as a magnetic recording device, an optical disc, a magneto-optical recording medium, or a semiconductor memory, may be adopted as the computer-readable recording medium.

Distribution of the program is performed by, for example, selling, giving, or renting a portable recording medium, such as a DVD or a CD-ROM, having the program recorded thereon. Alternatively, a configuration may be adopted in which the program is distributed by storing the program in a storage device of a server computer and transferring the program from the server computer to a different computer via a network.

A computer which executes the above-described program first temporarily stores a program recorded on a portable recording medium or a program transferred from a server computer in its storage device. At the time of execution of processing, the computer reads the program stored in the storage device and executes processing in accordance with the read program. As another mode of execution of the program, the computer may read the program directly from a portable recording medium and execute processing in accordance with the program or the computer may sequentially execute processing in accordance with the received program each time the program is transferred from the server computer to the computer. A configuration may be adopted in which the above-described processing is executed by a so-called ASP (Application Service Provider) service that does not transfer the program from the server computer to the computer and implements processing functions only by an instruction for execution of the program and acquisition of a result. Note that the program in the present embodiments is assumed to encompass information that is provided for use in processing by an electronic computer and is equivalent to a program (e.g., data which is not a direct instruction to a computer but has a property of stipulating computer processing).

Although the present devices are constructed by execution of a predetermined program on a computer in the embodiments, at least a part of processing details of the program may be implemented by hardware.

The invention claimed is:

1. A sound collection and emission method for an acoustic signal processing apparatus including a processor, a memory connected to the processor, and microphones to cause a driver to grasp a situation if a siren is included in acoustic signals collected by the microphones installed at an automobile, comprising:

detecting whether the siren emanating from outside the automobile is included in the acoustic signals collected by the microphones;

emitting acoustic signals obtained through conversion of the acoustic signals collected by the microphones from speakers installed inside the automobile if the siren is included in the acoustic signals collected by the microphones;

acquiring an operating state of the automobile; and emitting the acoustic signals obtained through the conversion if the operating state of the automobile meets a criterion for determination defined in advance and not emitting the acoustic signals obtained through the conversion if the operating state does not meet the criterion for determination, wherein the acoustic signals obtained through conversion of the acoustic signals collected by the microphones includes the siren, the operating state of the automobile comprises at least one of a state of a transmission or a steering angle of a steering wheel, and the sound collection and emission method comprises estimating a direction from which the siren arrives using the acoustic signals collected by the microphones, mixing the acoustic signals obtained through the conversion emitted from the speakers in accordance with the direction, and localizing a sound image of the acoustic signals obtained through the conversion in the direction.

2. The sound collection and emission method according to claim 1, further comprising:

emitting the acoustic signals obtained through the conversion from the estimated direction.

3. A sound collection and emission method for an acoustic signal processing apparatus including a processor, a memory connected to the processor, and a microphone to cause a driver to grasp a situation if a siren is included in an acoustic signal collected by the microphone installed at an automobile, comprising:

detecting whether the siren emanating from outside the automobile is included in the acoustic signal collected by the microphone; and suppressing an acoustic signal emitted inside the automobile if the siren is included, wherein the acoustic signal processing apparatus acquires an operating state from the automobile, in the operating state of the automobile, the acoustic signal processing apparatus controls whether to suppress the acoustic signal emitted inside the automobile on the basis of a criterion of whether the driver needs an outside sound in operation, and the operating state of the automobile comprises at least one of a state of a transmission or a steering angle of a steering wheel.

4. The sound collection and emission method according to claim 3, further comprising:

emitting, from a speaker installed inside the automobile, the acoustic signal for the driver to apprehend a vehicle which emanates the siren.

5. A sound collection and emission apparatus for emitting, on the basis of outside acoustic signals which emanate from a sound source outside a given automobile and arrives at the automobile, inside acoustic signals which are acoustic signals derived from the outside acoustic signals to inside the automobile, comprising:

processing circuitry configured to:

acquire information representing an operating state of the automobile; and perform control on whether to emit the inside acoustic signals from sound emission units on the basis of the information representing the operating state, wherein the inside acoustic signals are the outside acoustic signals themselves or acoustic signals which are obtained by converting the outside acoustic signals such that a driver is aware of the outside acoustic signals, and the operating state of the automobile comprises at least one of a state of a transmission or a steering angle of a steering wheel, and the processing circuitry is configured to estimate an arrival direction of a sound using the outside acoustic signals, mix the outside acoustic signals emitted from the sound emission units in accordance with the arrival direction, and localize a sound image in the arrival direction.

6. The sound collection and emission apparatus according to claim 5, wherein the processing circuitry is configured to:

adjust volume of each of sound emission units, which respectively correspond to a plurality of directions different from each other, on the basis of the arrival direction.

7. A sound collection and emission method, implemented by a sound collection and emission apparatus that includes processing circuitry, for emitting, on the basis of outside acoustic signals which emanates from a sound source outside a given automobile and arrives at the automobile, inside acoustic signals which are acoustic signals derived from the outside acoustic signals to inside the automobile, comprising:

collecting, by sound collection units, the outside acoustic signals;

emitting, by sound emission units, the inside acoustic signals;

acquiring, by the processing circuitry, information representing an operating state of the automobile; and performing, by the processing circuitry, control on whether to emit the inside acoustic signals from the sound emission units on the basis of the information representing the operating state, wherein the inside acoustic signals are the outside acoustic signals themselves or signals which are obtained by converting the outside acoustic signals such that a driver is aware of the outside acoustic signals, and the operating state of the automobile comprises at least one of a state of a transmission or a steering angle of a steering wheel, and the sound collection and emission method comprises estimating an arrival direction of a sound using the outside acoustic signals collected by the sound collection units, mixing the outside acoustic signals emitted from the sound emission units in accordance with the arrival direction, and localizing a sound image in the arrival direction.

8. A non-transitory computer-readable recording medium having recorded thereon a program for causing a computer to function as a sound collection and emission apparatus according to claim 5.

* * * * *